(12) United States Patent
Kijima et al.

(10) Patent No.: US 9,771,009 B2
(45) Date of Patent: Sep. 26, 2017

(54) VEHICLE SEAT

(71) Applicants: TS TECH CO., LTD., Asaka-shi, Saitama (JP); LEGGETT & PLATT, INCORPORATED, Carthage, MO (US)

(72) Inventors: Yuta Kijima, Tochigi (JP); Blake Wortley, Carthage, MO (US)

(73) Assignees: TS Tech Co., Ltd., Saitama (JP); Leggett & Platt, Incorporated, Carthage, MO (US)

( * ) Notice: Subject to any disclaimer, the term of this patent is extended or adjusted under 35 U.S.C. 154(b) by 80 days.

(21) Appl. No.: 14/928,240

(22) Filed: Oct. 30, 2015

(65) Prior Publication Data

US 2017/0120789 A1    May 4, 2017

(51) Int. Cl.
| | | |
|---|---|---|
| *A47C 7/30* | (2006.01) | |
| *B60N 2/72* | (2006.01) | |
| *B60N 2/70* | (2006.01) | |
| *A47C 7/28* | (2006.01) | |
| *A47C 7/20* | (2006.01) | |

(52) U.S. Cl.
CPC ............. *B60N 2/72* (2013.01); *B60N 2/7094* (2013.01); *A47C 7/20* (2013.01); *A47C 7/28* (2013.01); *A47C 7/287* (2013.01); *A47C 7/30* (2013.01); *B60N 2/7058* (2013.01)

(58) Field of Classification Search
CPC .. A47C 7/30; A47C 7/28; A47C 7/287; A47C 7/20; B60N 2/7058
USPC ................. 297/452.49, 452.54, 52.54, 452.5
See application file for complete search history.

(56) References Cited

U.S. PATENT DOCUMENTS

| | | | | |
|---|---|---|---|---|
| 4,454,636 A | * | 6/1984 | Pearson ................. | A47C 31/06 24/347 |
| 4,883,320 A | * | 11/1989 | Izumida ............... | B60N 2/7094 297/284.1 |
| 5,538,325 A | * | 7/1996 | Bullard .................. | A47C 31/06 297/440.22 |
| 5,542,775 A | * | 8/1996 | Bechtoldt ............. | A47C 31/06 24/350 |

(Continued)

FOREIGN PATENT DOCUMENTS

| | | |
|---|---|---|
| JP | 2004-114932 A | 4/2004 |
| JP | 2008-183107 A | 8/2008 |

(Continued)

*Primary Examiner* — Syed A Islam
(74) *Attorney, Agent, or Firm* — Drinker Biddle & Reath LLP (57) ABSTRACT

A vehicle seat that can reduce manufacturing costs while increasing assembling rigidity of an elastic spring for supporting an occupant is described. A vehicle seat includes an elastic spring bridged between a front frame and a rear frame to support an occupant. A hook member is attached to a rear end portion of the elastic spring to be hooked to the rear frame. The hook member includes a hook body extending along an outer periphery of the rear frame and a projection projecting from a front edge of the hook body toward the rear frame and formed to have a width smaller than a width of the hook body. A through-hole is formed in a portion of the hook body, which is opposed to the projection. The through-hole has a width larger than a width of the projection and a length larger than a projecting length of the projection.

9 Claims, 9 Drawing Sheets

(56) References Cited

U.S. PATENT DOCUMENTS

| | | | | |
|---|---|---|---|---|
| 5,833,064 A * | 11/1998 | Ayres | A47C 31/06 |
| | | | 206/340 |
| 6,415,481 B1 * | 7/2002 | Lackler | A47C 23/057 |
| | | | 24/347 |
| 6,616,239 B2 * | 9/2003 | Guillot | A47C 7/30 |
| | | | 267/81 |
| 7,137,669 B2 * | 11/2006 | Nagayama | A47C 7/02 |
| | | | 297/216.1 |
| 8,371,655 B2 * | 2/2013 | Nonomiya | B60N 2/4228 |
| | | | 297/216.14 |
| 8,662,483 B2 * | 3/2014 | Yamaguchi | B60N 2/002 |
| | | | 267/102 |
| 8,690,255 B2 * | 4/2014 | Yamaki | B60N 2/4228 |
| | | | 297/216.14 |
| 9,050,919 B2 * | 6/2015 | Matsumoto | B60N 2/7094 |
| 9,090,186 B2 * | 7/2015 | Wiegelmann | B60N 2/54 |
| 2004/0160113 A1 * | 8/2004 | Rehfuss | B60N 2/72 |
| | | | 297/452.52 |
| 2006/0152063 A1 * | 7/2006 | Nagayama | B60N 2/1615 |
| | | | 297/452.49 |
| 2007/0200416 A1 * | 8/2007 | Dotta | A47C 7/28 |
| | | | 297/452.49 |
| 2015/0306998 A1 * | 10/2015 | Matsui | B60N 2/68 |
| | | | 297/452.52 |
| 2016/0137113 A1 * | 5/2016 | Takahashi | B60N 2/7094 |
| | | | 297/452.52 |

FOREIGN PATENT DOCUMENTS

JP    2013103610 A  *  5/2013
JP    2014162431 A  *  9/2014

* cited by examiner

VEHICLE SEAT

BACKGROUND

Disclosed herein is a vehicle seat, and particularly a vehicle seat including an elastic support member attached to a seat frame, which forms a frame, for supporting an occupant.

There is conventionally known a vehicle seat which includes a cushion frame formed by a frame-shaped body and an elastic spring (elastic support member) spanned between front and rear portions of the cushion frame for supporting an occupant. In addition, a hook member which is configured to be hooked to the cushion frame is attached to one end portion of the elastic spring, and a shape of the hook member is designed variously and elaborately, for example, see Japanese Patent Document JP2008-183107A ("the '107 Document") and Japanese Patent Document JP2004-114932A ("the '932 Document").

A vehicle seat disclosed in the '107 Document includes: a cushion frame which has side frames arranged at right and left sides, a pan frame connecting front portions of the side frames at the right and left sides, and a pipe frame connecting rear portions of the side frames at the right and left sides; and plural springs which are stretched between the pan frame and the pipe frame. A spring end engagement member (hook member) to be hooked to the pipe frame is provided at rear end portions of the springs. The spring end engagement member is configured by a U-shaped resin-made collar and a substantially U-shaped metal-made retainer that respectively extend along an outer periphery of the pipe frame. The metal-made retainer is attached to the outside of the resin-made collar. In addition, each of the rear end portions of the springs is interposed between and hooked to spring engagement pieces respectively provided at base and distal ends of the metal-made retainer in an extending direction of the metal-made retainer. As described above, the resin-made collar is provided between the metal-made retainer and the pipe frame; thereby, noises generated by a contact between metallic members can be avoided. Further, the resin-made collar is formed of a relatively simple U-shape, therefore not requiring a slide mold, for example in metallic molding. Therefore, mold manufacturing costs are slightly reduced.

Likewise in a vehicle seat disclosed in the '932 Document, a spring support member (hook member) to be hooked to a pipe frame is provided at a rear end portion of a spring for a cushion. The spring support member is formed of a resin material and configured by a frame fitting portion having a substantially U-shape extending along an outer periphery of the pipe frame and by a spring support portion formed so as to extend continuously from an end portion of the frame fitting portion and be folded. The resin-made spring support member as described above is adopted; thereby, the number of components is reduced and an increase in weight is inhibited.

In addition, in order to increase assembling rigidity of the hook member relative to the pipe frame, the hook member is attached to the pipe frame so as to surround the outer periphery of the pipe frame as in the '107 Document and the '932 Document. However, the hook member as in the '107 Document is formed by plural components of the metal-made retainer and the resin-made collar; therefore, entire manufacturing costs may increase. Further, the hook member as in the '932 Document is formed of resin-made components only but has a relatively complicated shape. Therefore, manufacturing costs of metallic molding may increase. Thus, it is required that the assembling rigidity of the hook member relative to the pipe frame is increased, and in addition, that manufacturing costs of the hook member are further reduced.

SUMMARY

Various embodiments have been made in view of the above-described problems and include a vehicle seat that can increase assembling rigidity of an elastic support member for supporting an occupant, which is attached to a seat frame configuring a frame, and that can reduce manufacturing costs.

The above-described problems can be solved by the vehicle seat according to an embodiment, the vehicle seat including: a seat frame having a frame-shaped body; an elastic support member for supporting an occupant that bridges one part and an other part of the seat frame in a predetermined direction; and a hook member hooked to a hooked section in the one part and attached to an end portion of the elastic support member, the hook member further including a hook body extending along an outer periphery of the hooked section and a projection projecting from a front edge of the hook body toward the hooked section, the projection having a width smaller than a width of the hook body, the hook body further including a through-hole in a portion opposite to the projection in an orthogonal direction orthogonal to a projecting direction in which the projection projects, the through-hole having a width larger than a width of the projection and a length larger than a length of projecting in the projecting direction.

As described above, the hook member includes the hook body extending along the outer periphery of the hooked section, and the projection projecting from the front edge of the hook body toward the hooked section and having the width smaller than the width of the hook body. Therefore, assembling rigidity of the hook member relative to the hooked section can be increased. In addition, the through-hole extending in the orthogonal direction is formed in the portion of the hook body, which is opposite to the projection in the orthogonal direction orthogonal to the projecting direction of the projection, and the through-hole is formed to have the width larger than the width of the projection and the length larger than the length of projecting in the projecting direction. Therefore, in the case of molding the hook member, manufacturing costs can be reduced. In detail, in the hook member of the present embodiment, the projection is provided in addition to the hook body in order to increase the assembling rigidity relative to the seat frame. Therefore, the projection may cause undercuts when being molded. However, the through-hole is formed in the portion of the hook body, which is opposite to the projection; thereby, the hook member is elaborately designed so as to resolve the undercuts. As a result, at the time of metallic molding, for example, a slide mold is not necessary and the projection can be easily molded. Thus, mold manufacturing costs can be reduced.

Preferably, the seat frame is a cushion frame, the cushion frame further including a side frame in each side portion in a seat width direction, the side frame extending in a front to back direction of the seat, a front frame that couples each front potion of side frames, and a rear frame that couples each rear portion of the side frames. Preferably, a plurality of the elastic support members are provided at predetermined intervals in the seat width direction and bridge the front frame and the rear frame. Preferably, the hook member is a resin member and is hooked to an outer periphery of the rear frame. According to the aforementioned configuration, for the elastic support member for the cushion frame of the seat frame, to which a seating load of an occupant is particularly applied, assembling rigidity can be increased and manufacturing costs can be reduced. Further, the hook member is formed by the resin member; therefore, abnormal noises generated by a contact between metal members can be avoided. In addition, an increase in weight is inhibited.

It is preferable that the rear frame is a pipe frame having a substantially circular shape in cross-section and that the hook body has a substantially U-shape and extends to contact along an outer peripheral surface of the pipe frame. According to the aforementioned configuration, the hook member is simply shaped to conform to a shape of the pipe frame. Thus, resin molding costs of the hook member can be further reduced.

Preferably, the hook body further includes: a frame contact section that extends to contact along an outer peripheral surface of the rear frame; and a frame cover that extends from the frame contact section in the seat width direction to cover the rear frame. As described above, the hook body includes the frame cover that extends in the seat width direction to cover the rear frame; therefore, the assembling rigidity of the hook member relative to the rear frame can be increased.

It is preferable that a plurality of the frame contact sections are provided at predetermined intervals in the seat width direction, that each end portion of the plurality of the frame contact sections is attached to the each end portion of the plurality of the elastic support members, and that the frame cover couples at least two or more of the frame contact sections. According to the aforementioned configuration, connecting rigidity among each of the elastic support members, the hook member, and the rear frame can be increased.

Preferably, a plurality of the projections and the through-holes are respectively provided in the frame cover at predetermined intervals in the seat width direction. According to the aforementioned configuration, complicated molds are not necessary for resin molding and the assembling rigidity of the hook member can be increased.

It is preferable that the projection is a first projection and that a second projection is provided between the through-holes in the frame cover, the second projection projecting from the frame cover toward the rear frame. As described above, the plural second projections are arranged at intervals; thereby, a contact area between the hook body and the rear frame can be adjusted. As a result, the assembling rigidity of the hook member can be balanced with the assembling operability utilizing deflection of the hook member. In addition, the second projection is formed between the plural through-holes; thereby, rigidity around the through-hole of the hook member can be secured.

It is preferable that the through-hole extends from the portion opposite to the projection toward the projection in the frame cover and that the width of the through-hole narrows toward the projection. According to the aforementioned configuration, an appropriate resin moldability of the projection of the hook member can be obtained.

Preferably, an exposure hole for exposing a portion of the end portion of the elastic support member is provided in a tail edge portion of the hook body, to which the end portion of the elastic support member is attached. According to the aforementioned configuration, in the case of integral molding (insert molding) of the metallic elastic support member with the resin hook member, the exposure hole is utilized; thereby, a retaining member for retaining a portion of the elastic support member can be attached. As a result, the insert molding can be successfully performed. In addition, the exposure hole is formed in the hook body; thereby, an attached state of the elastic support member can be visually checked.

BRIEF DESCRIPTION OF THE DRAWINGS

Various embodiments of the invention are illustrated in the drawings, in which.

DETAILED DESCRIPTION

A vehicle seat according to a first embodiment of the present disclosure is described as follows with reference to FIGS. 1 to 10. The first embodiment relates to a vehicle seat of the present disclosure, the vehicle seat including: an elastic support member for supporting an occupant that bridges a front frame and a rear frame of a cushion frame; and a hook member hooked to the rear frame and attached to a rear end portion of the elastic support member, the hook member including: a hook body extending along an outer periphery of the rear frame and a projection projecting from a front edge of the hook body toward the rear frame and having a width smaller than a width of the hook body, the hook body including a through-hole in a portion opposite to the projection in an orthogonal direction orthogonal to a projecting direction in which the projection projects, the through-hole having a width larger than a width of the projection and a length larger than a length of projecting in the projecting direction. In addition, a side at which an occupant is seated with respect to a seat back of the vehicle seat is a front side of the seat.

Figure 1:
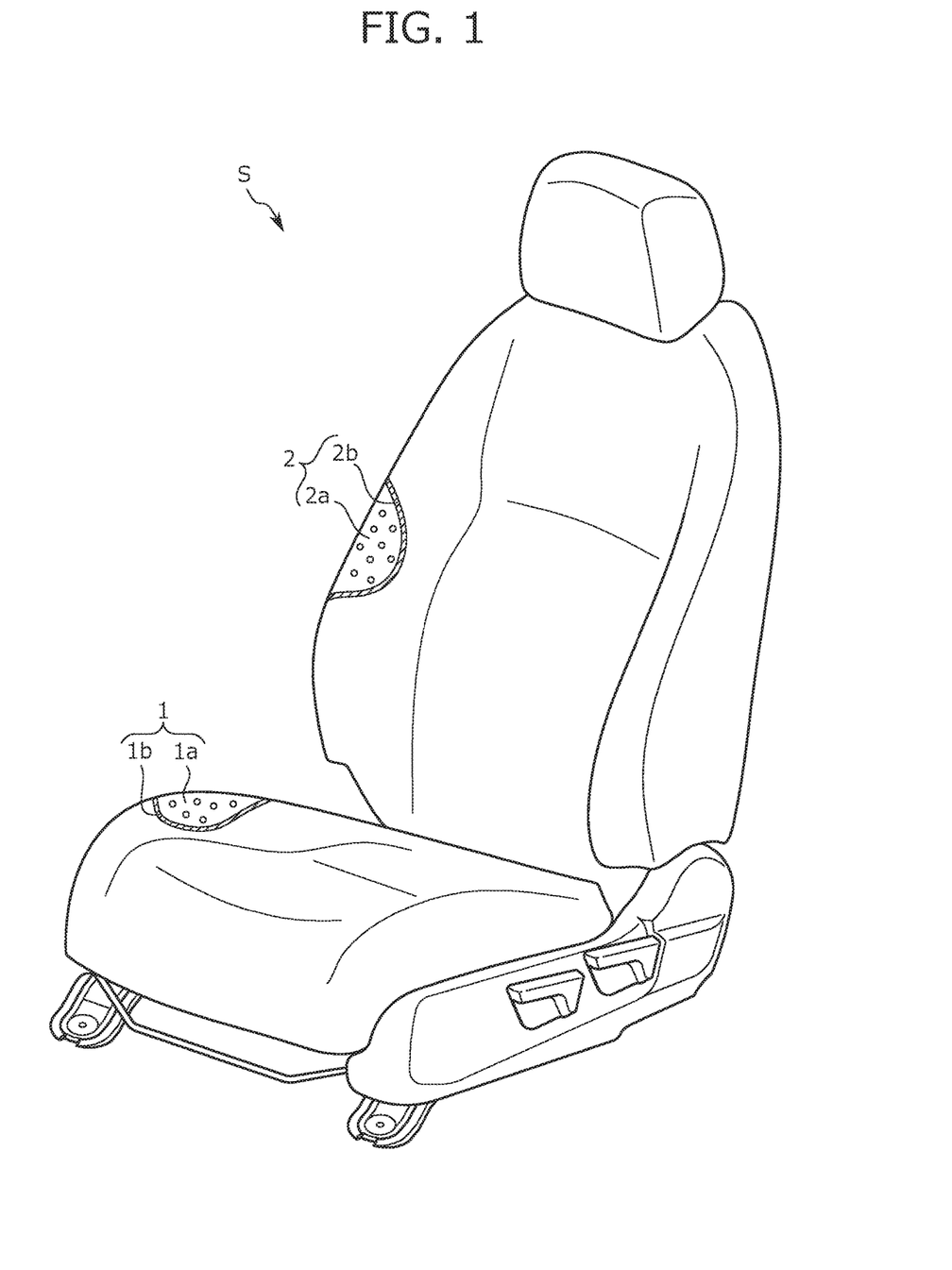
FIG. 1 is a perspective view of a vehicle seat according to a first embodiment of the present disclosure.
Figure 2:
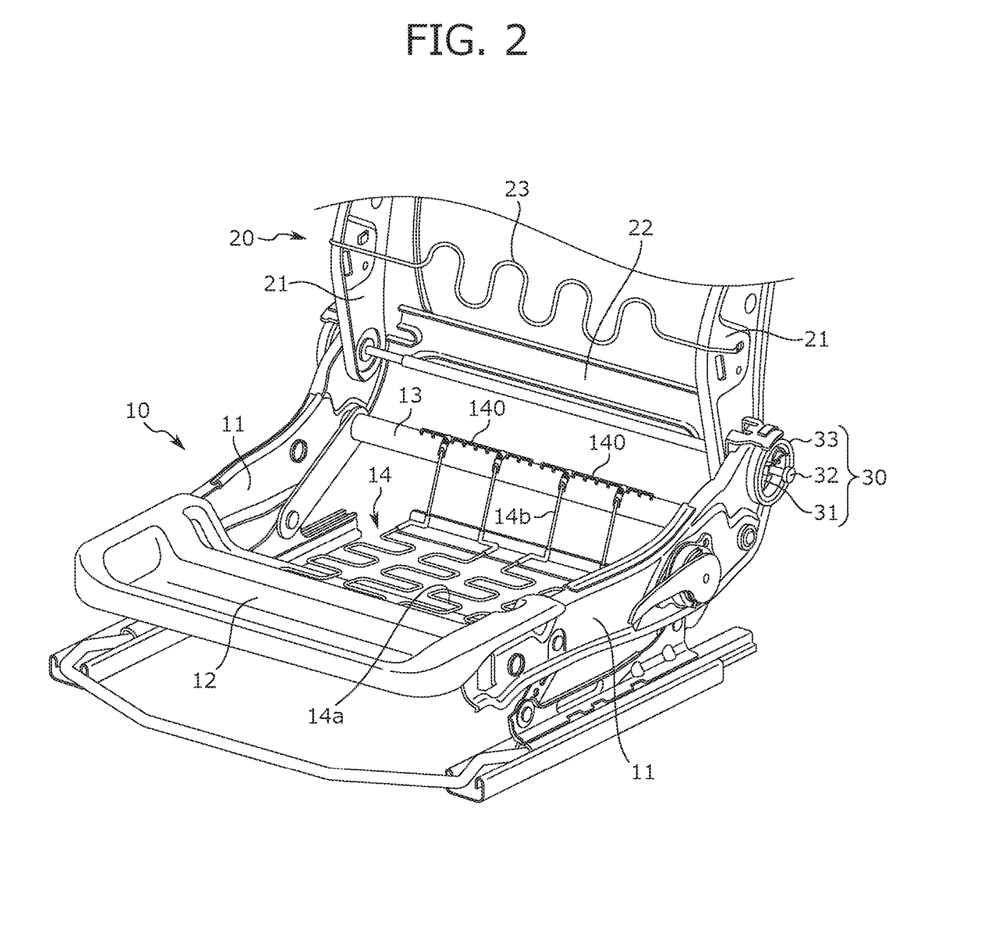
FIG. 2 is a perspective view of a seat frame that forms a frame of the vehicle seat.

A vehicle seat S of the first embodiment mainly includes: a seat body which is provided with a seat cushion 1 and a seat back 2 as shown in FIG. 1; and a reclining device 30 which connects the seat cushion 1 and the seat back 2 so that the seat back 2 is pivotal relative to the seat cushion 1 as shown in FIG. 2. As shown in FIG. 1, the seat cushion 1 is a seating portion which supports an occupant from below. The seat cushion 1 is configured in such a way that a cushion pad 1*a* mounted on a cushion frame 10 shown in FIG. 2 and serving as a frame (seat frame) is covered by a surface material 1*b*. The seat back 2 is a backrest which supports the back of an occupant from behind. The seat back 2 is configured in such a way that a cushion pad 2a mounted on a back frame 20 shown in FIG. 2 and serving as a frame is covered by a surface material 2b.

As shown in FIG. 2, the cushion frame 10 is formed by a frame-shaped body having a substantially rectangular shape. The cushion frame 10 mainly includes: side frames 11 arranged at right and left sides; a front frame 12 connecting front portions of the respective side frames 11; and a rear frame 13 connecting rear portions of the respective side frames 11. Further, plural elastic springs 14 are bridged between the front frame 12 and the rear frame 13 so as to extend in a meandering manner. Furthermore, each of the elastic springs 14 corresponds to an elastic support member in the embodiments.

Each of the side frames 11 is formed in a metallic plate member having a substantially I-shape in vertical cross-section. The side frame 11 extends in a front to back direction of the seat. The front frame 12 is attached to the front portion of the side frame 11 while the rear frame 13 and the reclining device 30 are attached to the rear portion of the side frame 11. The front frame 12 is a pan frame which supports the thigh of an occupant. The front frame 12 is formed by a plate body having a substantially rectangular shape, and both end portions of the front frame 12 in a width direction of the seat are mounted on upper surfaces of the side frames 11 to be attached to the upper surfaces. The rear frame 13 is a pipe frame having a substantially circular shape in cross-section, and both end portions of the rear frame 13 in the width direction of the seat are fitted into side surfaces of the side frames 11 to be attached to the side surfaces.

The elastic spring 14 is the elastic support member which supports the buttocks of an occupant and which is formed by a metallic wire. As shown in FIG. 2, the four elastic springs 14 are provided at predetermined intervals in the width direction of the seat. A front end portion 14a of each of the elastic springs 14 is directly hooked to a rim of a hook hole (not shown) which is formed in the center of the front frame 12 in the width direction of the seat. Further, a hook member 140 to be hooked to an outer peripheral portion of the rear frame 13 is attached to a rear end portion 14b of each of the elastic springs 14.

As shown in FIG. 2, the back frame 20 mainly includes: back side frames 21 which are formed by frame-shaped bodies each having a rectangular shape and are arranged at the right and left sides; an upper frame (not shown) which has a reversed U-shape and connects upper end portions of the respective back side frames 21; and a lower frame 22 which has a plate shape and connects lower end portions of the respective back side frames 21. Further, plural elastic springs 23 are bridged between the back side frames 21 at the right and left sides so as to extend in a meandering manner. Each of the back side frames 21 is formed by a metallic plate member having a substantially horizontal U-shape in cross-section. The back side frame 21 extends in an up to down direction. The lower end portion of the back side frame 21 is connected via the reclining device 30 with a rear end portion of the side frame 11. Each of the elastic springs 23 is an elastic support member which supports the backrest for an occupant. Both right and left end portions of the elastic spring 23 are directly hooked to rims of hook holes (not shown) which are formed in side surfaces of the back side frames 21.

As shown in FIG. 2, the reclining device 30 can be shifted between a locked state where a pivotal movement of the seat back 2 is locked and a released state where the pivotal movement of the seat back 2 is released from the locked state. When the seat back 2 is locked in a stand-up state, an operating lever (not shown) is operated; thereby, the reclining device 30 releases the seat back 2 locked in the stand-up state therefrom. Thus, the reclining device 30 can regulate the stand-up state of the seat back 2. Specifically, the reclining device 30 mainly includes: a reclining unit 31 which regulates the pivotal movement of the back frame 20; a pivot shaft 32 which is pivotally supported by the lower end portion of the back side frame 21 along the width direction of the seat and which protrudes from an outer surface of the back side frame 21 to be connected to the reclining unit 31; and a spiral spring 33 attached to the outside of the reclining unit 31 to bias the back frame 20 toward the front side of the seat. The pivot shaft 32 is pivotally supported by the back side frame 21 and the side frame 11 in the width direction of the seat and the operating lever (not shown) is further attached to a protruded end portion of the pivot shaft 32. One end portion of the spiral spring 33 is locked by the back frame 20 while the other end portion of the spiral spring 33 is locked by the cushion frame 10.

Figure 3:
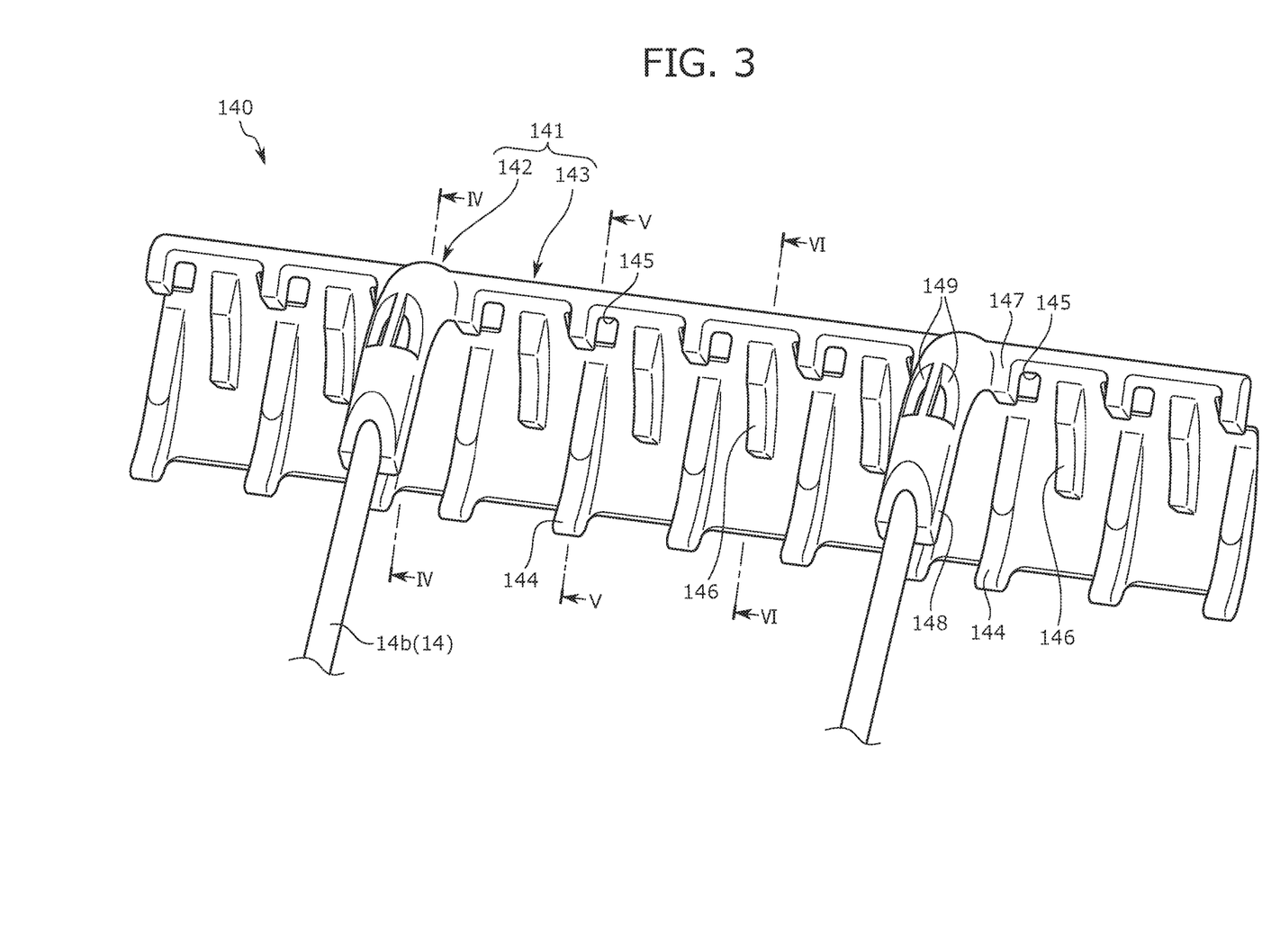
FIG. 3 is a perspective view of a hook member attached to one end of an elastic spring.

As shown in FIG. 2 and FIG. 3, the hook member 140 serves to hook one end portion of the elastic spring 14 to a hooked section of the cushion frame 10. The hook member 140 integrally formed with the end portion of the elastic spring 14 is a resin member elongated in the width direction of the seat. The two hook members 140 are attached to the center of the rear frame 13 in the width direction of the seat and arranged side by side in the width direction of the seat.

As shown in FIG. 2 and FIG. 3, the hook member 140 mainly includes: a hook body 141 extending along an outer periphery of the rear frame 13; and a first projection 144 formed to have a width smaller than a width of the hook body 141 in the width direction of the seat and projecting forward from a front edge of the hook body 141 toward the rear frame 13. In detail, the hook body 141 is configured by a frame contact section 142 which has a substantially U-shape extending along an outer peripheral surface of the rear frame 13 in a contactable manner and by a frame cover 143 which extends from the frame contact section 142 in the width direction of the seat to cover the rear frame 13 from above and behind.

Figure 4:
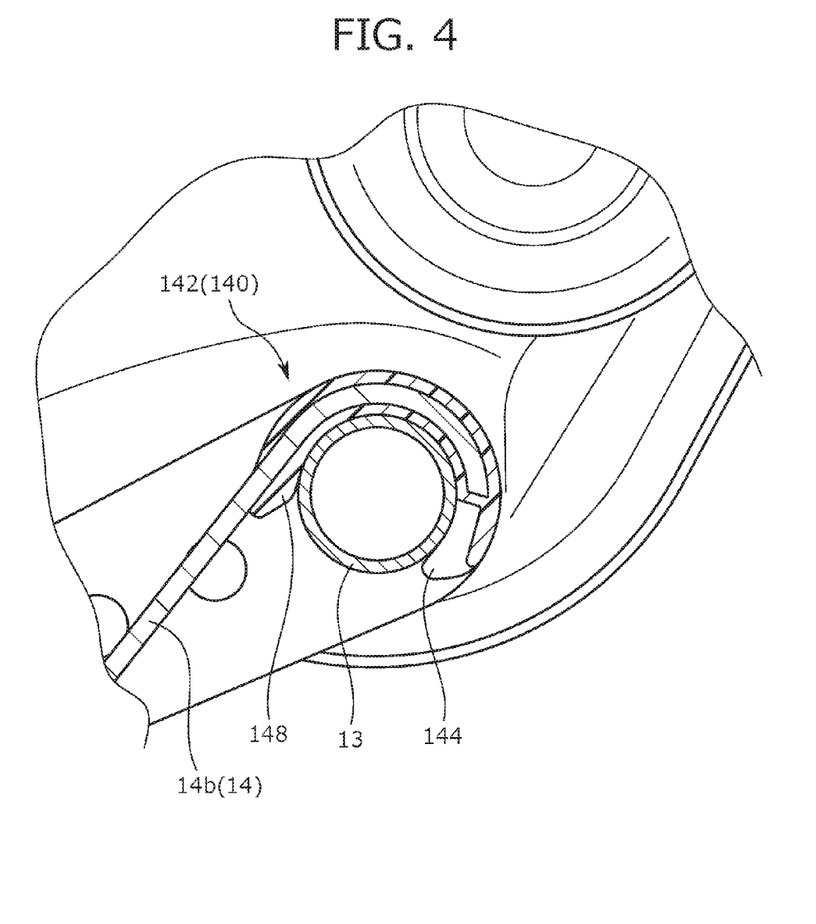
FIG. 4 is a cross-sectional view taken along the line IV-IV of the hook member of FIG. 3.

As shown in FIG. 3 and FIG. 4, the frame contact section 142 is formed of a substantially hollow shape. The two frame contact sections 142 are provided at intervals in the width direction of the seat. The frame contact sections 142 are provided in a state where the rear end portions 14b of the elastic springs 14 are inserted into the frame contact sections 142, respectively. In detail, as shown in FIG. 4, the rear end portion 14b of the elastic spring 14 is inserted into and attached to the frame contact section 142 so as to extend from a distal end portion of the frame contact section 142 to a portion adjacent to a base end portion of the frame contact section 142 in an extending direction of the frame contact section 142. In addition, the frame contact section 142 extends along the outer periphery of the rear frame 13 so as to extend over a top side of the rear frame 13 from a front side to a back side of the rear frame 13.

Figure 5:
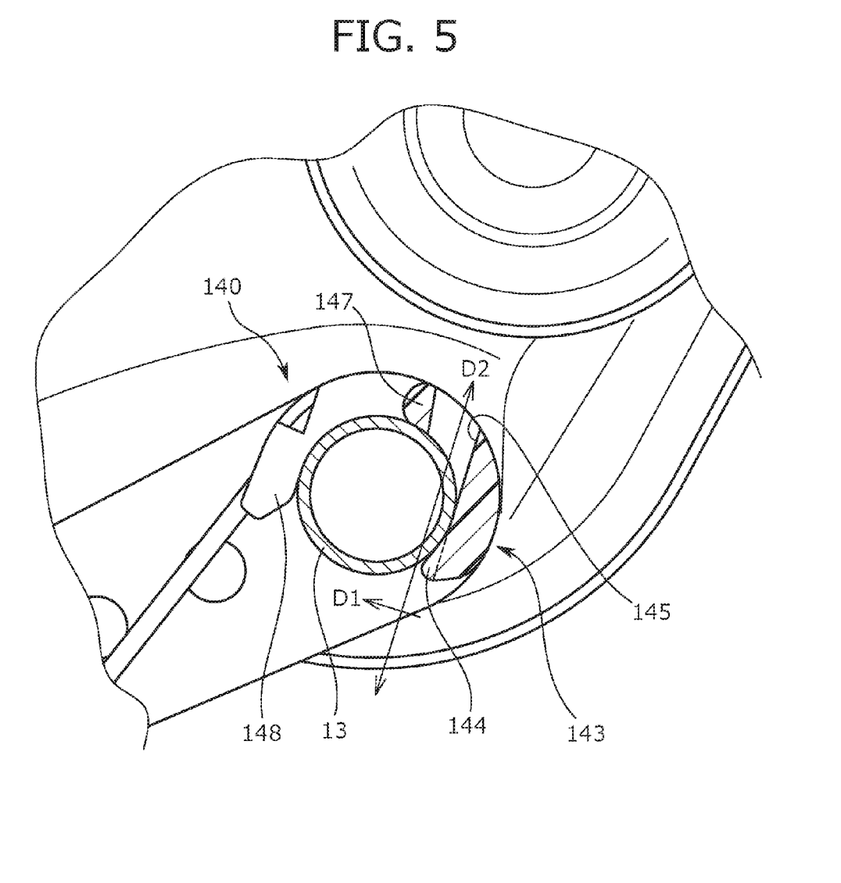
FIG. 5 is a cross-sectional view taken along the line V-V of the hook member of FIG. 3.
Figure 6:
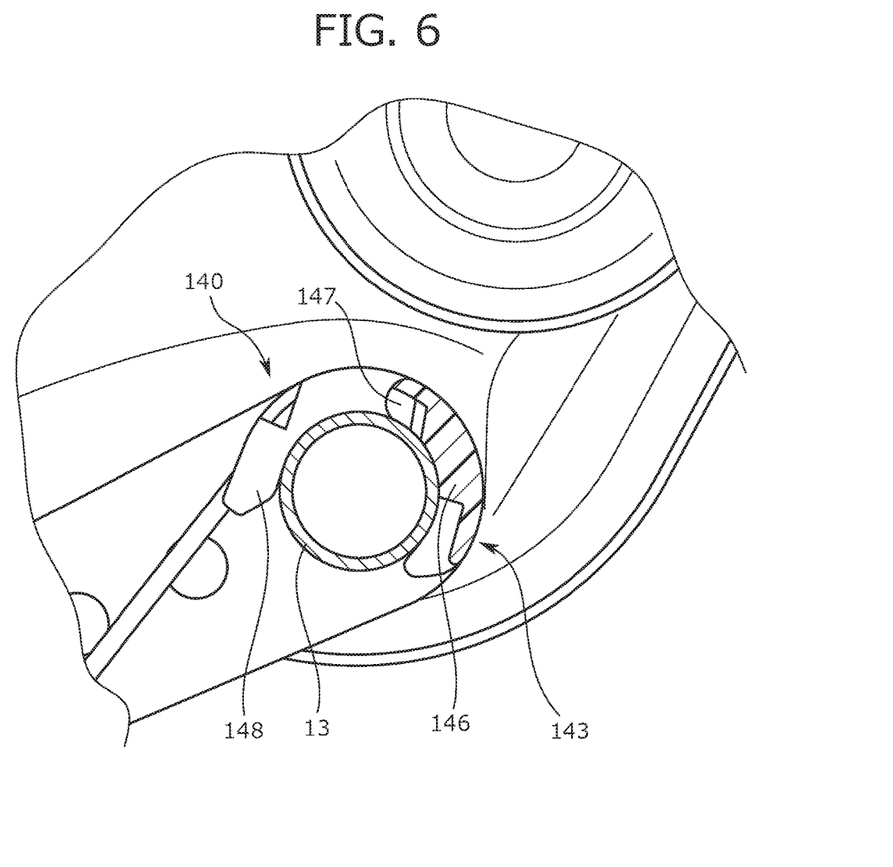
FIG. 6 is a cross-sectional view taken along the line VI-VI of the hook member of FIG. 3.

As shown in FIG. 3 and FIG. 5, the frame cover 143 formed in a substantially plate shape extends in the width direction of the seat so as to connect rear portions of the two frame contact sections 142. Further, the frame cover 143 extends along the outer periphery of the rear frame 13 from the top side to the back side of the rear frame 13. The plural first projections 144 described above are formed at an extended distal end portion of the frame cover 143 in an outer peripheral direction of the rear frame 13 so as to be spaced in the width direction of the seat. In addition, through-holes 145 are respectively formed in portions of the frame cover 143, each of which is opposed to each of the first projections 144 in an orthogonal direction D2 orthogonal to a projecting direction D1 of the first projection 144. Further, as shown in FIG. 3 and FIG. 6, in the frame cover 143, second projections 146 are respectively formed between the plural through-holes 145 in the width direction of the seat. Each of the second projections 146 projects forward from the center in an up to down direction of the frame cover 143 toward the rear frame 13. Furthermore, in the frame cover 143, third projections 147 are respectively formed between the second projections 146 in the width direction of the seat. Each of the third projections 147 projects downward from an upper end portion of the frame cover 143 toward the rear frame 13.

As shown in FIG. 3 and FIG. 5, the first projection 144 extends along the outer peripheral surface of the rear frame 13. The first projection 144 is arranged in a position different from the position of the frame contact section 142 in the width direction of the seat. In addition, as shown in FIG. 5, the first projection 144 projects forward and slightly diagonally upward from a lower end portion of the frame cover 143 toward the rear frame 13. The first projection 144 is formed so that an upper surface (inner surface) of a projected end portion comes into contact with the rear frame 13.

As shown in FIG. 3 and FIG. 5, each of the through-holes 145 is a substantially rectangular hole and is formed in a position of the frame cover 143, which is opposed to the end portion of the first projection 144 in the orthogonal direction D2. In other words, the through-hole 145 is formed in a position of the frame cover 143, which is opposed to the upper surface (inner surface) of the first projection 144. Further, the through-hole 145 is formed to have a width larger than the width of the first projection 144 in the width direction of the seat. Furthermore, the through-hole 145 is formed to be larger than a projected length of the first projection 144 in the front to back direction of the seat. Furthermore, as shown in FIG. 3, the through-hole 145 is formed to extend from the portion of the frame cover 143, which is opposed to the first projection 144, in a direction toward the first projection 144. Moreover, the width of the through-hole 145 narrows in the direction toward the first projection 144.

As shown in FIG. 3 and FIG. 6, the second projection 146 extends along the outer peripheral surface of the rear frame 13 and projects forward and slightly diagonally downward from the center in the up to down direction of the frame cover 143 toward the rear frame 13. The second projection 146 is formed so that a front surface of a projected end portion comes into contact with the rear frame 13. In detail, as shown in FIG. 3, a portion of the front surface of the second projection 146, which is in contact with the rear frame 13, is arranged between the first projection 144 and the through-hole 145 in the outer peripheral direction of the rear frame 13.

As shown in FIG. 3 and FIG. 5, the third projection 147 is formed so that a bottom surface of a projected end portion comes into contact with the rear frame 13. In detail, a portion of the bottom surface of the third projection 147, which is in contact with the rear frame 13, is arranged in a position above the first projection 144 and the second projection 146 in the outer peripheral direction of the rear frame 13.

According to the foregoing configuration, as shown in FIG. 5, the through-hole 145 extending in the orthogonal direction D2 is formed in the portion of the frame cover 143, which is opposed to the first projection 144 in the orthogonal direction D2 orthogonal to the projecting direction D1 of the first projection 144. Therefore, at the time of metallic molding of the hook member 140, the first projection 144 can be prevented from causing undercuts when the first projection 144 is being molded. As a result, at the time of the metallic molding, for example, a slide mold is not necessary and the first projection 144 can be easily molded; therefore, mold manufacturing costs are reduced.

Further, according to the foregoing configuration, as shown in FIG. 3, the first projection 144 and the third projection 147 are arranged in a position different from the position of the second projection 146 and in an alternating manner with the second projection 146 in the width direction of the seat. Furthermore, the first projection 144, the second projection 146, and the third projection 147 are arranged in positions different from one another in the up to down direction. Therefore, a contact area between the hook member 140 and the rear frame 13 can be adjusted. As a result, the hook member 140 is formed so as to have a shape where assembling rigidity of the hook member 140 is balanced with assembling operability utilizing deflection of the hook member 140.

Further, according to the foregoing configuration, as shown in FIG. 3 and FIG. 4, a fourth projection 148 is formed at the distal end portion of the frame contact section 142 in the extending direction. The fourth projection 148 projects downward from the distal end portion of the frame contact section 142 toward the rear frame 13 and slightly inclined rearward toward the rear frame 13. The fourth projection 148 is formed so that an upper surface (inner surface) of a projected end portion comes into contact with the rear frame 13. The fourth projection 148 is arranged in a position different from the positions of the first projection 144, the second projection 146, and the third projection 147 in the width direction of the seat. In addition, the fourth projection 148 is arranged in the same position as the second projection 146 in the up to down direction or is arranged in a position slightly lower than the second projection 146 in the up to down direction. Therefore, the assembling rigidity of the hook member 140 relative to the rear frame 13 can be increased. In addition, rigidity of a distal end portion of the hook member 140, to which the elastic spring 14 is attached, can be increased. Moreover, a draft direction of a straight-pull mold having two halves is set as the orthogonal direction D2 at the time of the metallic molding; thereby, as shown in FIG. 5, undercuts are not generated around the fourth projection 148 and costs of the metallic molding can be reduced.

Further, according to the foregoing configuration, as shown in FIG. 3, a pair of exposure holes 149 is formed in the distal end portion of the frame contact section 142, to which the rear end portion 14b of the elastic spring 14 is attached. The elastic spring 14 is partially exposed through the exposure holes 149 to the outside of the frame contact section 142. Therefore, in the case of integral molding of the metallic elastic spring 14 (insert molding) with the resin hook member 140, the exposure holes 149 are utilized; thereby, a retaining member (not shown) for retaining a portion of the elastic spring 14 can be attached. As a result, the insert molding can be successfully performed. In addition, the exposure holes 149 are utilized; thereby, an attached state of the elastic spring 14 can be visually checked.

Hook Member of Second Embodiment

Figure 7:
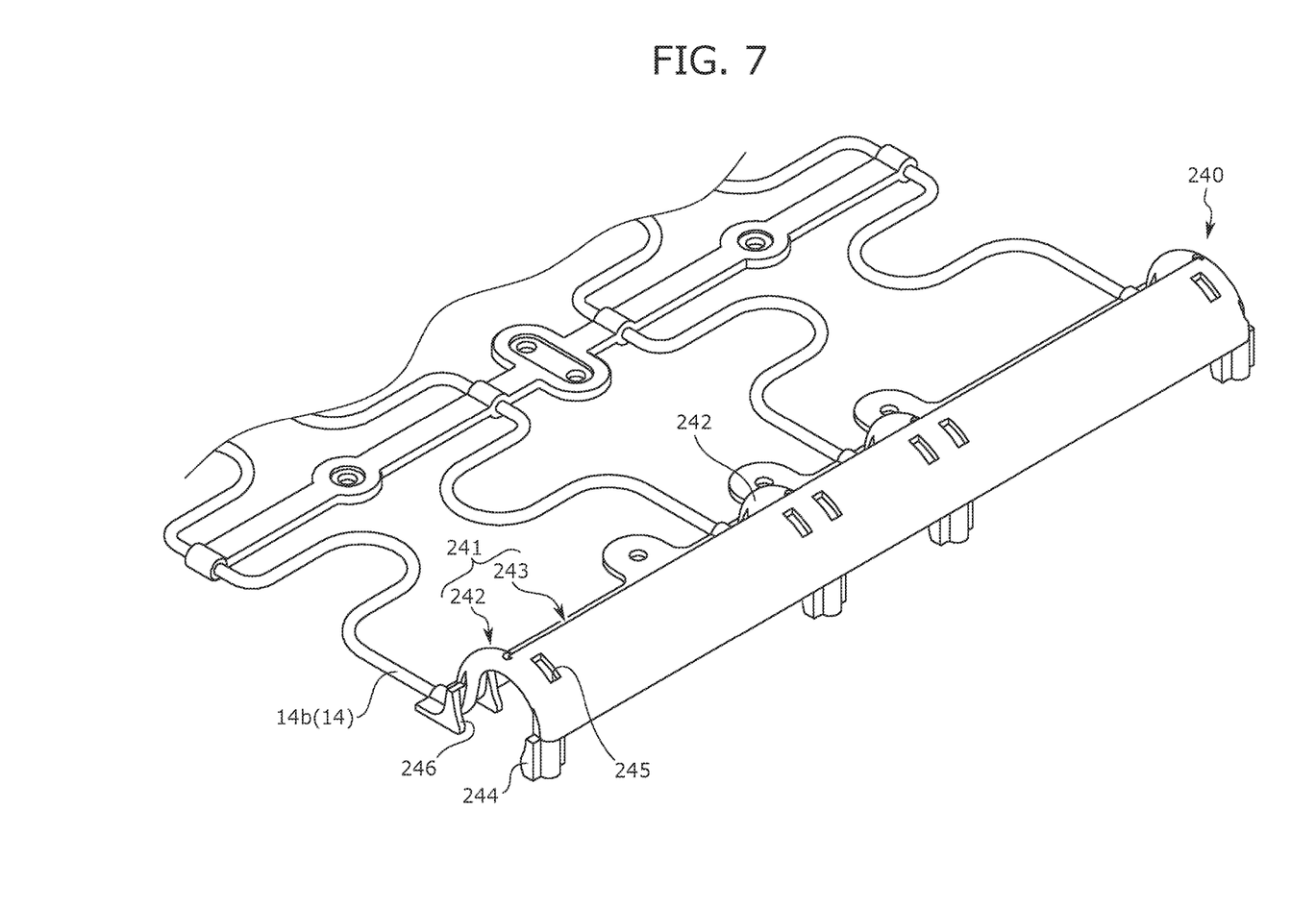
FIG. 7 is a perspective view of a hook member according to a second embodiment of the present disclosure.
Figure 8:
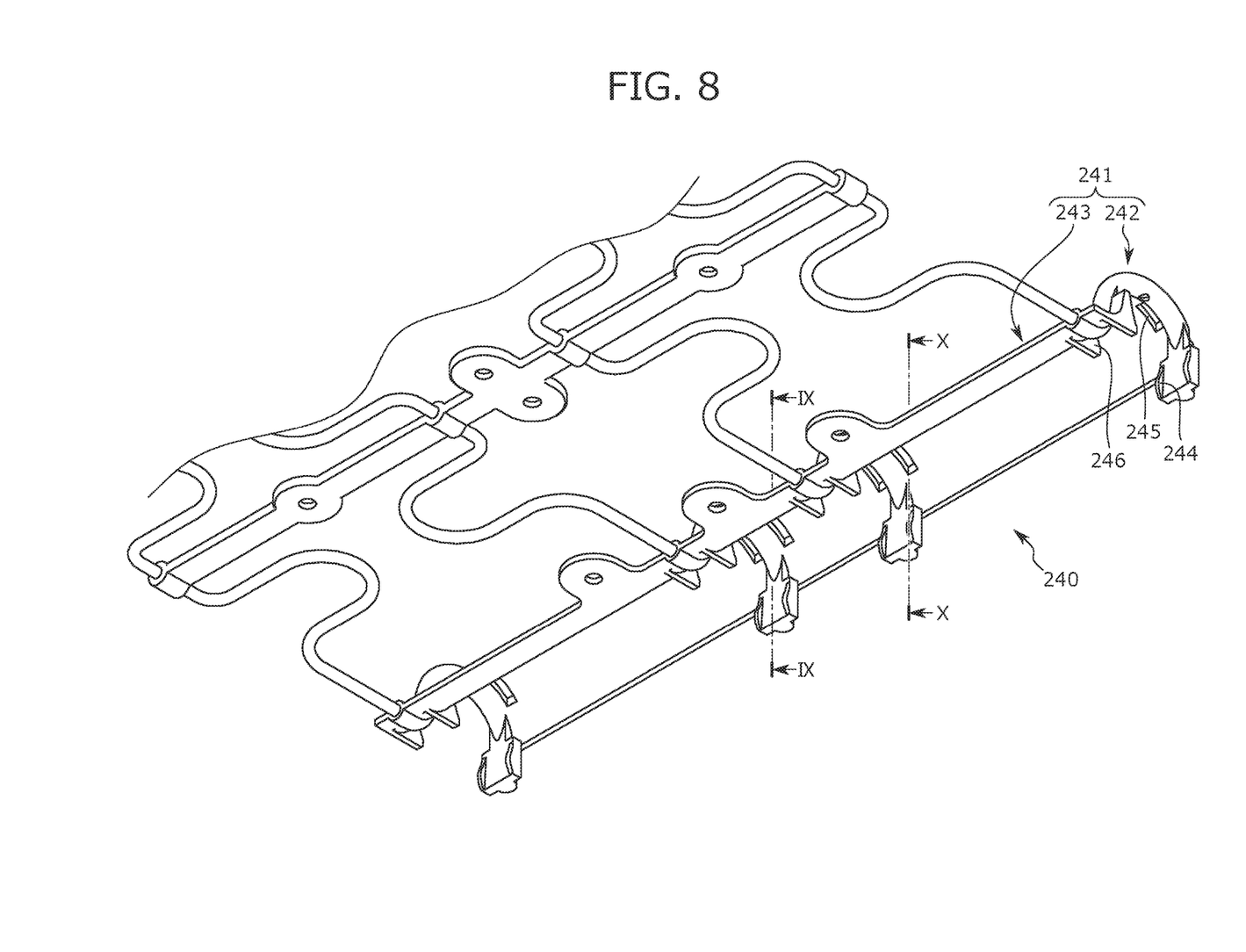
FIG. 8 is a perspective view of the hook member according to the second embodiment as seen from a different angle.

Next, a hook member of a second embodiment of the present disclosure is described on the basis of FIGS. 7 to 10. Note that the content which overlaps with the hook member 140 described above is not described below. As shown in FIG. 7 and FIG. 8, a hook member 240 according to the second embodiment includes: a hook body 241 extending along the outer periphery of the rear frame 13; and a first projection 244 projecting forward from a front edge of the hook body 241 toward the rear frame 13. In detail, the hook body 241 is configured by a frame contact section 242 which has a substantially U-shape extending along the outer peripheral surface of the rear frame 13 in a contactable manner and by a frame cover 243 which extends from the frame contact section 242 in the width direction of the seat to cover the rear frame 13 from above and behind.

Figure 9:
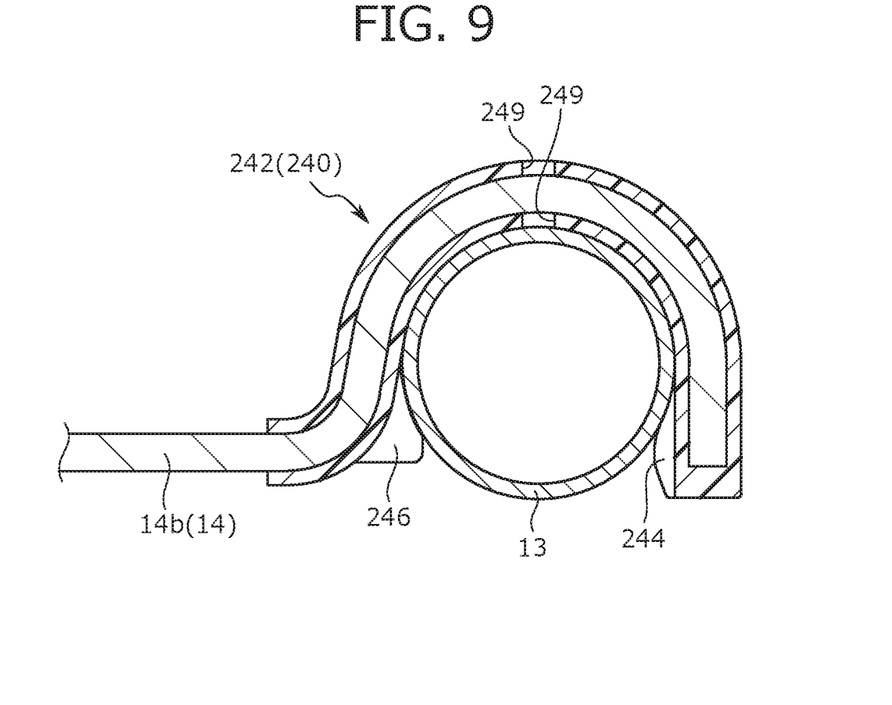
FIG. 9 is a cross-sectional view taken along the line IX-IX of the hook member according to the second embodiment of FIG. 8.
Figure 10:
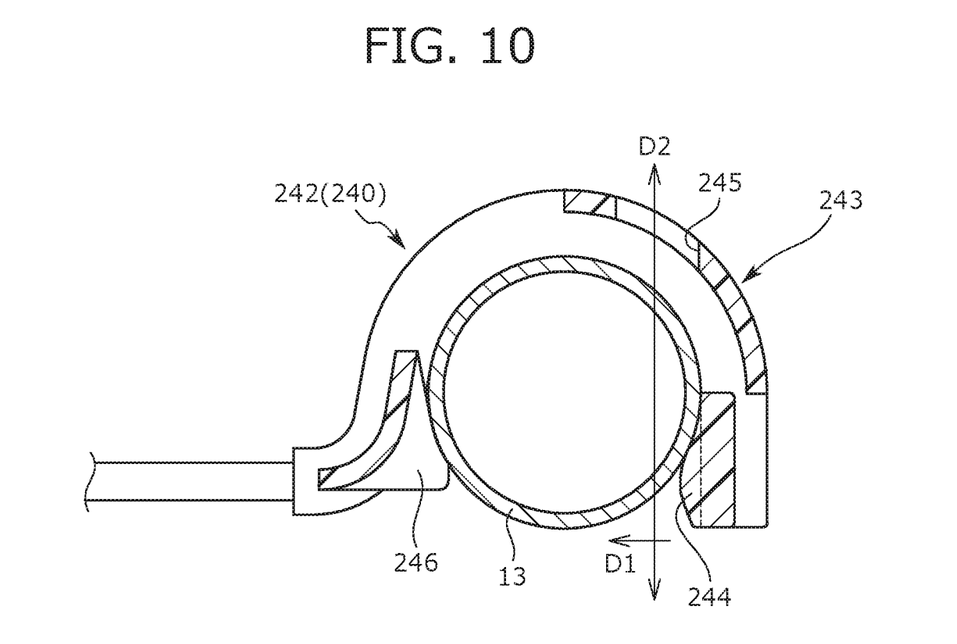
FIG. 10 is a cross-sectional view taken along the line X-X of the hook member according to the second embodiment of FIG. 8.

As shown in FIG. 8 and FIG. 10, the eight first projections 244 described above are formed at extended base end portions of the frame contact sections 242 in the outer peripheral direction of the rear frame 13 so as to be spaced in the width direction of the seat. In addition, through-holes 245 are respectively formed in portions of the frame contact section 242, each of which is opposed to each of the first projections 244 in the orthogonal direction D2 orthogonal to the projecting direction D1 of the first projection 244. Further, as shown in FIG. 8 and FIG. 9, eight second projections 246 are formed at distal end portions of the frame contact sections 242 so as to be spaced in the width direction of the seat. Each of the second projection 246 projects rearward from the distal end portion of the frame contact section 242 toward the rear frame 13. Furthermore, four exposure holes 249 are formed in upper end portions of the frame contact sections 242 so as to be spaced in the width direction of the seat. The elastic spring 14 is partially exposed through each of the exposure holes 249 to the outside of the frame contact section 242.

As shown in FIG. 8 and FIG. 10, the first projection 244 is arranged in a position different from the position of the second projection 246 in the width direction of the seat. Further, the first projection 244 is arranged in the same height position as the second projection 246 in the up to down direction. The through-hole 245 is a substantially rectangular hole and is formed in a position of the frame contact section 242, which is opposed to an end portion of the first projection 244 in the orthogonal direction D2. In other words, the through-hole 245 is formed in a position of the frame contact section 242, which is opposed to an inner surface (upper surface) of the first projection 244.

Likewise, according to the foregoing configuration, at the time of metallic molding of the hook member 240, the first projection 244 can be prevented from causing undercuts when the first projection 244 is being molded. As a result, at the time of the metallic molding, for example, a slide mold is not necessary and the first projection 244 can be easily molded; therefore, mold manufacturing costs are reduced. Further, a draft direction of a straight-pull mold having two halves is set as the orthogonal direction D2 at the time of the metallic molding; thereby, as shown in FIG. 10, undercuts are not generated regarding the second projection 246 and costs of the metallic molding can be further reduced.

In the foregoing embodiments, as shown in FIG. 2, the elastic spring 14 (the elastic support member) according to the present disclosure is bridged between the front frame 12 and the rear frame 13 of the cushion frame 10, but not especially limited thereto. The arrangement of the elastic spring 14 can be changed. For example, the elastic spring 14 may be bridged between the right and left side frames 11.

In the foregoing embodiments, as shown in FIG. 2, the hook member 140 is attached to the rear end portion of the elastic spring 14 to be hooked to the rear frame 13 that serves as the hooked section, but not especially limited thereto. The arrangement of the hook member 140 can be changed. For example, the hook member 140 may be attached to the front end portion of the elastic spring 14 to be hooked to a predetermined position of the front frame 12 that serves as the hooked section. Further, for example, in a case where the elastic spring 14 is bridged between the right and left side frames 11, the hook member 140 may be attached to each of both right and left end portions of the elastic spring 14 to be hooked to each of the side frames 11 that serves as the hooked section. Furthermore, for example, the hook member 140 may be attached to each of the both right and left end portions of the elastic spring 23 of the back frame 20. In detail, the hook member 140 may be attached to each of the both right and left end portions of the elastic spring 23 to be hooked to each of the back side frames 21 that serves as the hooked section.

In the foregoing embodiments, as shown in FIG. 3, the hook body 141 is configured by the frame contact section 142 and the frame cover 143, but not especially limited thereto. The configuration of the hook body 141 can be changed. For example, the hook body 141 may be configured only by the frame contact sections 142 having a substantially U-shape and the first projection 144 (the projection) may project from the extended base end portion of the frame contact section 142. Thus, the hook member 140 having a relatively simple shape is obtained.

In the foregoing embodiments, as shown in FIG. 5, the through-hole 145 is formed in a portion of the hook member 140, which is opposed to the first projection 144 in the orthogonal direction D2 orthogonal to the projecting direction D1 of the first projection 144. In other words, in order to resolve undercuts to be generated by molding the first projection 144 at the hook member 140, the through-hole 145 is preferably formed in a position of the hook member 140, which is opposed to the first projection 144 in the draft direction of the straight-pull mold.

In the foregoing embodiments, a vehicle seat applied to an automobile is explained as a concrete example, but not limited thereto. The vehicle seat of the present disclosure can be utilized as a vehicle seat for a train, a bus, or the like, or as a passenger seat for an airplane, a boat, or the like.

The vehicle seat according to the present disclosure is mainly explained in the embodiments. In this regards, the foregoing embodiments are merely examples to facilitate understanding of the present disclosure and do not restrict the invention. The embodiments may be changed or modified without departing from the scope of the invention and may include its equivalents.

What is claimed is:

1. A vehicle seat comprising:
   a seat frame having a frame-shaped body;
   an elastic support member for supporting an occupant that bridges one part and an other part of the seat frame in a predetermined direction; and
   a hook member, wherein:
   the hook member is hooked to a hooked section in the one part of the seat frame, and is attached to an end portion of the elastic support member;
   the hook member further comprises a hook body extending along an outer periphery of the hooked section, and a projection projecting from a front edge of the hook body toward the hooked section, the projection having a width smaller than a width of the hook body;
   the hook body further comprises a through-hole in a portion opposite to the projection in an orthogonal direction that is orthogonal to a projecting direction in which the projection projects, the through-hole extending in the orthogonal direction; and the through hole has a width larger than a width of the projection, and a length larger than a length of projecting in the projecting direction.

2. The vehicle seat according to the claim 1, wherein:
the seat frame is a cushion frame;
the cushion frame further comprises a side frame in each side portion of the cushion frame in a seat width direction, the side frame extending in a front to back direction of the seat, a front frame that couples each front potion of side frames, and a rear frame that couples each rear portion of the side frames;
a plurality of the elastic support members are provided at predetermined intervals in the seat width direction, and bridge the front frame and the rear frame; and
the hook member is a resin member, and is hooked to an outer periphery of the rear frame.

3. The vehicle seat according to claim 2, wherein:
the hook body further comprises:
a frame contact section that extends to contact along an outer peripheral surface of the rear frame; and
a frame cover that extends from the frame contact section in the seat width direction to cover the rear frame.

4. The vehicle seat according to claim 3, wherein:
a plurality of the frame contact sections are provided at predetermined intervals in the seat width direction;
each end portion of the plurality of the frame contact sections is attached to the each end portion of the plurality of the elastic support members; and
the frame cover couples at least two or more of the frame contact sections.

5. The vehicle seat according to claim 3, wherein a plurality of the projections and the through-holes are respectively provided in the frame cover at predetermined intervals in the seat width direction.

6. The vehicle seat according to claim 3, wherein:
the projection is a first projection; and
a second projection is provided between the through-holes in the frame cover, the second projection projecting from the frame cover toward the rear frame.

7. The vehicle seat according to claim 3, wherein the through-hole extends from the portion opposite to the projection toward the projection in the frame cover, and the width of the through-hole narrows toward the projection.

8. The vehicle seat according to claim 1, wherein an exposure hole for exposing a portion of the end portion of the elastic support member is provided in a tail edge portion of the hook body, to which the end portion of the elastic support member is attached.

9. The vehicle seat according to claim 2, wherein:
the rear frame is a pipe frame having a substantially circular shape in cross-section; and
the hook body has a substantially U-shape, and extends to contact along an outer peripheral surface of the pipe frame.

* * * * *